(12) United States Patent
Shankar et al.

(10) Patent No.: US 11,233,794 B2
(45) Date of Patent: Jan. 25, 2022

(54) ACCESS MANAGEMENT SYSTEM WITH AN ESCORT-ADMIN SESSION ENGINE

(71) Applicant: MICROSOFT TECHNOLOGY LICENSING, LLC, Redmond, WA (US)

(72) Inventors: Chetan S. Shankar, Redmond, WA (US); LiLei Cui, Sammamish, WA (US); Sandeep Kalarickal S, Kirkland, WA (US); Thomas Charles Knudson, Draper, UT (US); Pavan Gopal Bandla, Duvall, WA (US); Pradeep Ayyappan Nair, Bellevue, WA (US); Aaron Keith Rosenfeld, Redmond, WA (US); Tyler S. Wiegers, Redmond, WA (US); Sudharshan Reddy Bommu, Redmond, WA (US); Margus Janese, Kirkland, WA (US); Mario Mett, Kirkland, WA (US); Chi Zhou, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 58 days.

(21) Appl. No.: 16/458,168

(22) Filed: Jun. 30, 2019

(65) Prior Publication Data
US 2020/0412723 A1 Dec. 31, 2020

(51) Int. Cl.
*H04L 29/06* (2006.01)
*H04L 29/08* (2006.01)

(52) U.S. Cl.
CPC ............. *H04L 63/10* (2013.01); *H04L 63/20* (2013.01); *H04L 67/10* (2013.01); *H04L 67/32* (2013.01)

(58) Field of Classification Search
CPC ....... H04L 63/20; H04L 63/101; H04L 67/32; H04L 67/10; H04L 63/10
USPC .......................................................... 726/1
See application file for complete search history.

(56) References Cited

U.S. PATENT DOCUMENTS

| 10,375,177 B1 * | 8/2019 | Bretan .................. H04L 67/306 |
| 2003/0154403 A1 * | 8/2003 | Keinsley ................. H04L 63/08 726/8 |
| 2020/0412735 A1 * | 12/2020 | Suhail ................... H04L 63/105 |

* cited by examiner

*Primary Examiner* — Frantz B Jean
(74) *Attorney, Agent, or Firm* — Shook, Hardy & Bacon L.L.P.

(57) ABSTRACT

Methods, systems, and computer storage media for providing escorted-access management based on an escort-admin session engine are provided. The escort-admin session engine approves an external administrator's access to a resource instance based on a service team policy, while approving an escort operator to escort the external administrator in an escort-admin session that provides access to the resource. In operation, an external administrator's request for access to a resource is evaluated based on the service team policy that is managed by a service team. The request is approved with access rights to the resource identified in the policy. An escort operator is identified for the external administrator. The escort operator is approved to escort the external administrator for access to the resource during an escort-admin session. The escort-admin session includes an escort operator context referring to the escort operator having access rights based on the access rights approved using the policy.

20 Claims, 7 Drawing Sheets

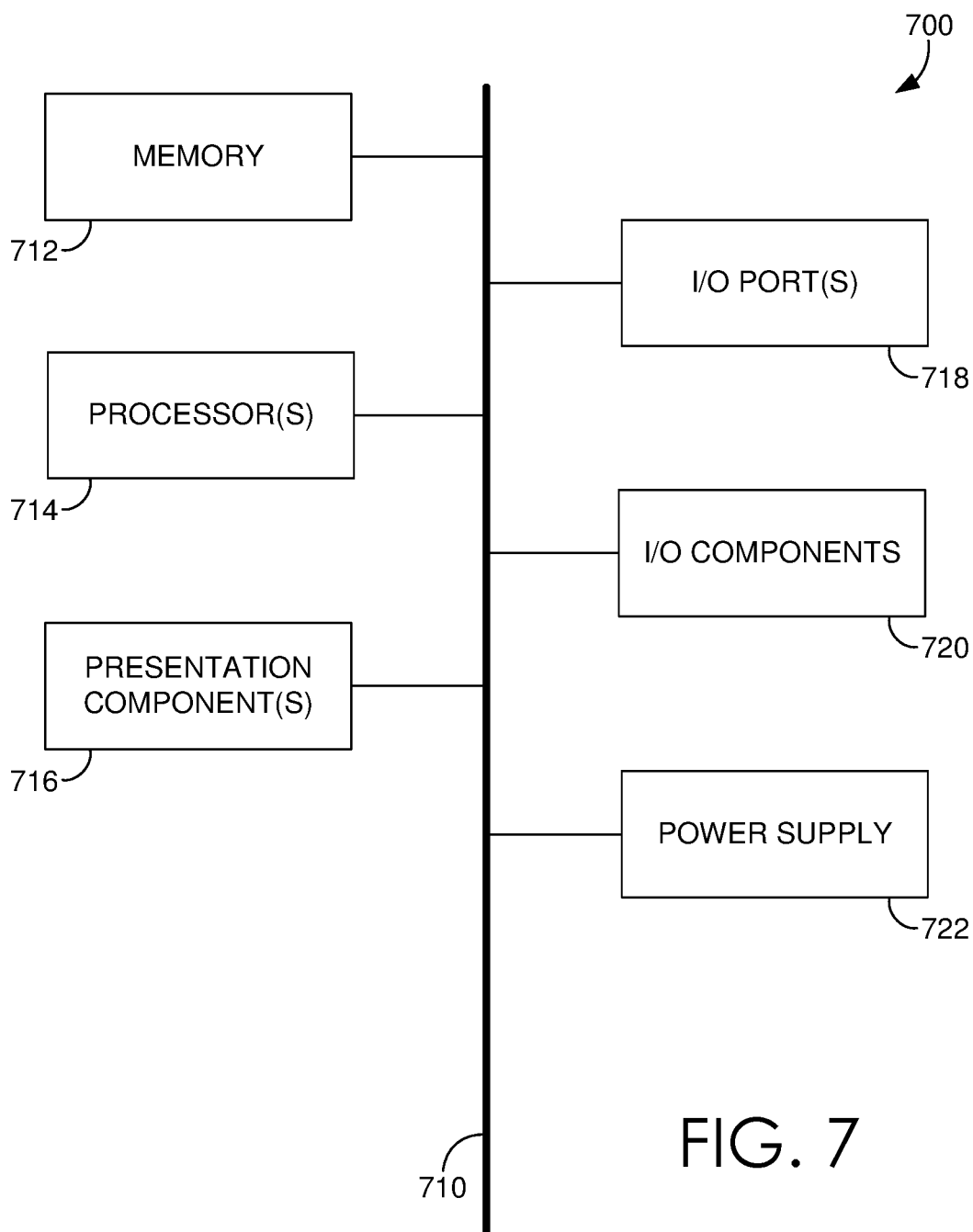

ACCESS MANAGEMENT SYSTEM WITH AN ESCORT-ADMIN SESSION ENGINE

BACKGROUND

Users often rely on computing resources such as applications and services to perform various computing tasks. Distributed computing environments can support building, deploying, and managing applications and services. Users and enterprises are moving away from traditional computing environments to run their applications and services on distributed computing environments. Distributed computing environments implement security mechanisms (e.g., access management systems) to ensure the security of different types of computing resources in the distributed computing environments. As distributed computing environments increasingly support applications and services, providing both improved secure provisioning of access to computing resources and data security in distributed computing environments is important.

SUMMARY

Various aspects of the technology described herein are generally directed to systems, methods, and computer storage media, for among other things, providing escorted-access management for an access management system to support administrators (support personnel—"external administrator") access to distributed computing environment resources ("resources") based on an escort-admin session engine. In particular, the escort-admin session engine provides escort-admin session operations that are executed to approve an external administrator's access to a resource instance based on a service team policy, while approving an escort operator to escort the external administrator in an escort-admin session that provides access to the resource instance. The escort-admin session includes an escort operator context which refers to the escort operator having dependent access rights associated the access rights approved based on the service team policy. The dependency relationship between the approved access rights and the dependent access rights can be defined in a variety of ways (e.g., the same rights, substantially the same, or mapped to a set of rights on the computing environment); however, generally, the approved access rights from the service team policy inform the dependent access rights that are actually used to access the computing environment In this regard, the escort operator context (dependent access rights) is the active context for accessing the resource; however, approval of the external administrator's access is based on a policy (e.g., service team policy) that is controlled by a service team of the resource instance.

By way of background, a customer (i.e., tenant) of a distributed computing environment may utilize various computing resources in an access-controlled computing environment ("computing environment") of the distributed computing environment. The computing resources may malfunction, thus requiring repair, troubleshooting, replacement, or updates (i.e., "support operations"). For example, the computing environment may have a virtual machine (VM) that malfunctions and becomes inaccessible because of a failed component in the VM, and an admin (e.g., software engineer, support personnel) of the distributed computing environment provider ("provider") needs access to perform support operations to restore functionality. The admin can request access using an access control manager (e.g., Just-In-Time "JIT" system) access management system that provisions access to the computing environment. In particular, the access control manager may provide temporary access to the computing environment to diagnose and repair the malfunctioning VM.

Conventional access management systems can support escorted sessions; however, there are several limitations with current implementations. By way of example, an access management system governance model may be a relationship-based access approval model, where access is granted based on knowing or trusting the person getting access. Such a model, at very least, introduces the possibility of human error because of the amount of human intervention involved. In addition, the external administrators are likely getting overly broad access rights to the distributed computing environment (as discussed in more detail below). Further, while in smaller distributed computing environments, where trust can be established based on personal relationships, a relationship-based access approval model may work; however, this governance model is not ideal. In particular, as the number of internal service teams and distributed computing environment resources grow, this access management system model is not able to scale. As such, an alternative approach for providing an escorted-access management that can provide controlled and appropriately scoped escorted access to resource instance would improve computing operations for more secure and efficient access provisioning operations.

Aspects of the technical solution described in the present disclosure are directed towards improving escorted-access management in an access management system of a distributed computing environment ("computing environment") based on an escort-admin session engine that supports escort-admin session operations that are executed to approve an external administrator's access to a resource instance based on a service team policy, while approving an escort operator to escort the external administrator in an escort-admin session that provides access to the resource instance. An external administrator's request for access to a resource instance is evaluated based on a policy that is managed by a service team. The request is approved with appropriately scoped access rights to the resource. An escort operator is identified for the external administrator after the request is approved, the escort operator approved to escort the external administrator for access to the resource instance during an escort-admin session. The escort-admin session includes an escort operator context which refers to the escort operator having access rights (during the escort-admin session) based on the same access rights approved using the service team policy. As such, the escorted-access management supports controlled approval and determination of the scope of access based on a policy and controlled access based on an escort-admin session defined based on the approved scope of access allowed by the policy.

In operation, a request from an external administrator is received, where the request is for access to a resource instance in a computing environment. The resource instance can be associated with a service team and a service team policy. The service team policy is configurable to define rules for approving access to computing environments that require escorted access. The rules indicate admin rights that indicate the scope of access to resources of computing environments. Based on the request and the service team policy, the external administrator's access to the resource instance is approved. Based on approving the access to the resource instance, an escort operator for the external administrator is identified and an escort-admin session between the escort operator and the external administrator is approved.

The escort-admin session includes an escort operator context having the access rights corresponding to the access rights of the external administrator based on the service team policy. As such, the external administrator is provided access to the resource only based on the escort-admin session, while allowing a service team of the resource instance to control access approval and the scope of the access to the resource instance. Additional aspects of the technical solution are described below, by way of exemplary implementations, with reference to technical solution environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 7 is a block diagram of an exemplary computing environment suitable for use in implementing aspects of the technology described herein.

DETAILED DESCRIPTION

Figure 1:
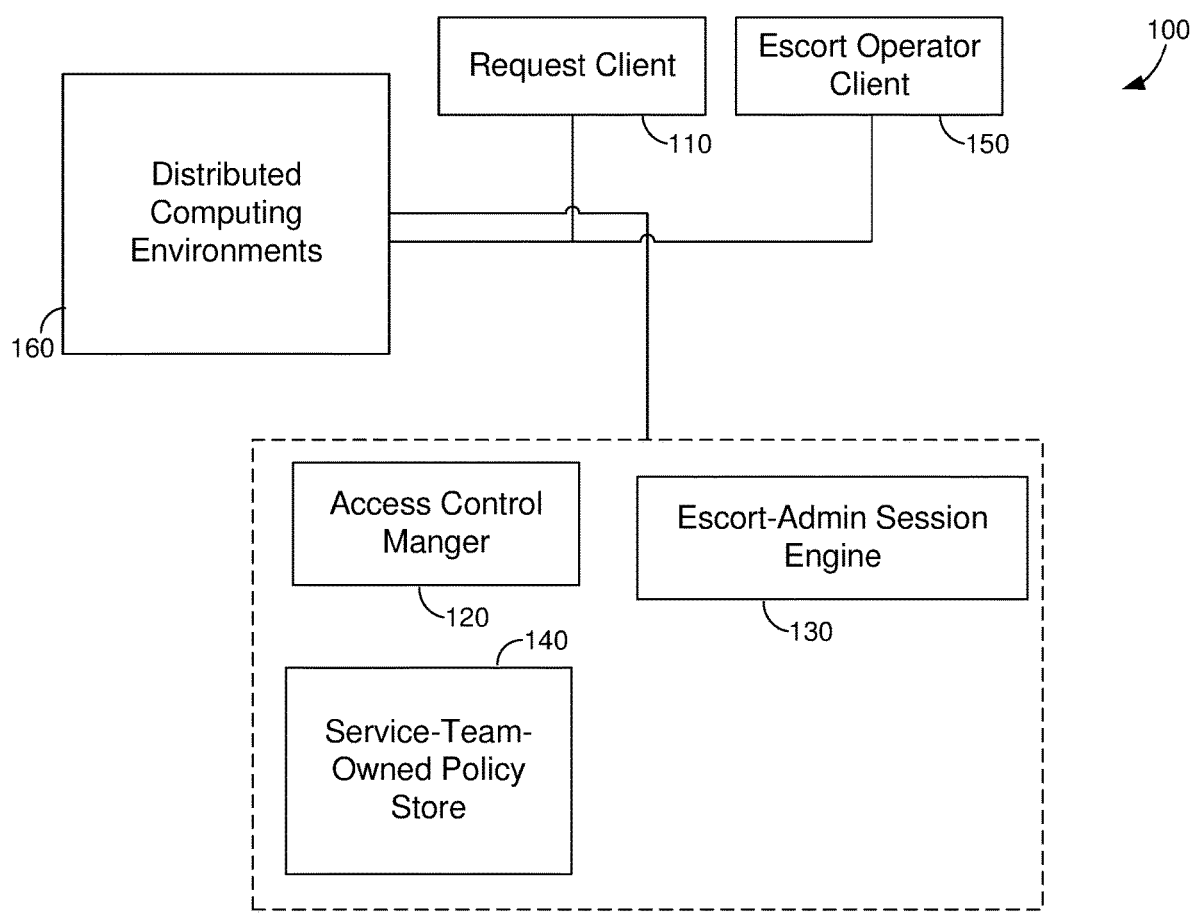
FIG. 1 is a block diagram of an exemplary access management environment for providing escorted-access management operations using an escort-admin session engine, suitable for use in implementing aspects of the technology described herein.

Overview of Aspects of the Technological Improvement

Distributed computing system providers ("provider") can support different types of distributed computing environments. For example, a "national cloud" may refer to physical and logical network-isolated instances of cloud services, which are confined within the geographic borders of specific countries and operated by local personnel. Distributed computing environments implement security mechanisms (e.g., access management systems) to ensure the security of different types of computing resources (e.g., computing access and secure user data) in the computing environments. A distributed computing environment can include different types of resources (e.g., fabric controller, virtual machines, networking, applications, and services).

By way of background, support for the distributed computing environment can be split between internal administrators (i.e., internal service teams) and external administrators (i.e., external service teams). In particular, because some distributed computing environments are dedicated for specific uses, the internal service teams are primarily responsible for support operations. However, the provider still remains responsible for support of these resources in situations where the internal service teams cannot address issues. External service teams, each having corresponding resources, can supplement the internal service teams to support the distributed computing environments. For example, a fabric controller team of external administrators can be responsible for making updates or addressing any failure in components of the fabric controller. The distributed computing environment can implement an access management system to support providing access to the external service team. Access to a particular resource can be provided for a limited period of time. Moreover, the access management system may specifically be an escorted access, where an external administrator is escorted by an escort operator of the distributed computing environment to ensure increased security.

Conventional access management systems can support escorted sessions; however, there are several limitations to the current implementation. By way of example, an external administrator (e.g., a service team developer) sends an access request email to an escort operator. The access request email indicates that the external administrator needs access to a resource (e.g., fabric controller). Currently, usually based on existing relationships between internal administrators (including the escort operator) and the external administrator, the escort operator provides access to the distributed computing environment and then escorts the external administrator. In particular, the escort operator, who has access rights (likely elevated access) to the distributed computing environment, escorts the external administrator, who now also has whatever access rights the escort operator has. An escort operator could also service different types of external administrators, with each getting the scope of access rights associated with the escort operator.

In smaller distributed computing environments, where trust can be established based on personal relationships, this access management system may work; however, this governance model is not ideal. Moreover, as the number of internal and service teams and distributed computing environment resources grows, this access management system is not able to scale. At a high level, some problems with the current access management system governance model include the external administrators getting overly broad access rights to the distributed computing environment and no roles for the service teams (i.e., resource owner) in managing access and policies for the resource. Moreover, there exists an increased likelihood of causing unexpected harm to resources (especially with the possibility of human error because of the amount of human intervention involved) and compliance requirements are not being met. As such, an alternative approach for providing an escorted-access management system that can provide access to admins to different types of access-controlled computing environments would improve computing operations for more secure and efficient escorted-access provisioning operations.

Embodiments of the present invention are directed to simple and efficient methods, systems, and computer storage media for providing escorted-access management in an access management system of a distributed computing environment ("computing environment") based on an escort-admin session engine that supports escort-admin session operations that are executed to approve an external administrator's access to a resource instance based on a service team policy, while approving an escort operator to escort the external administrator in an escort-admin session that provides access to the resource instance.

Figure 2:
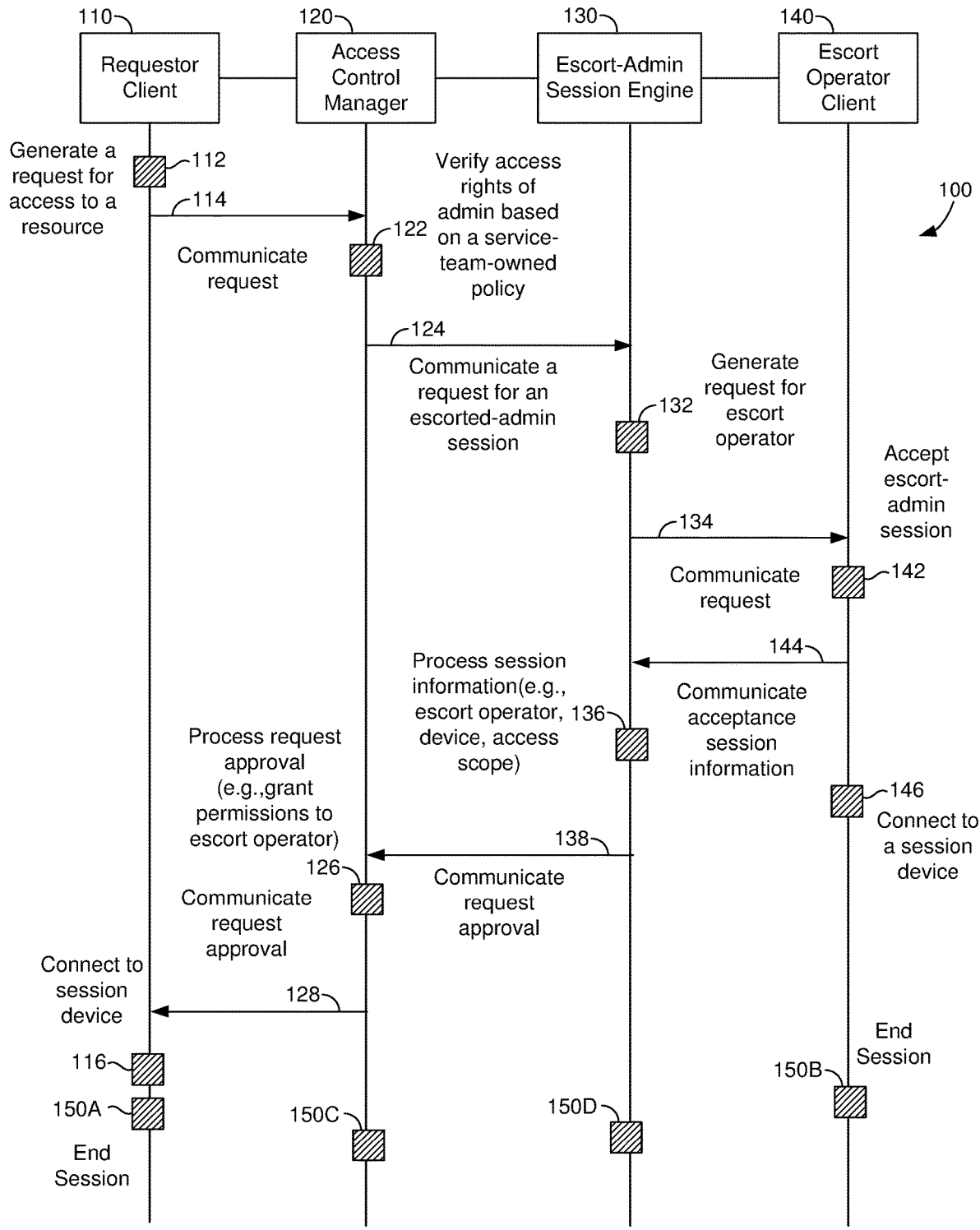
FIG. 2 is an exemplary access management environment for providing escorted-access management operations using an escort-admin session engine, in accordance with aspects of the technology described herein.

Overview of Example Environments for Providing Escorted-Access Management Operations Using an Escorted-Admin Session Engine Aspects of the technical solution can be described by way of examples and with reference to FIG. 1 and FIG. 2. FIG. 1 and FIG. 2 are associated with an exemplary technical solution environment (access management environment 100) suitable for use in implementing embodiments of the technical solution. Generally the technical solution environment includes a technical solution system suitable for providing escorted-access management based on an escort-admin session engine. With initial reference to FIG. 1, FIG. 1 discloses access management environment 100 having request client 110, access control manager 120, escorted-admin session engine 130, service-team-owned policy store 140, escort operator client 150, and distributed computing environments 160.

At a high level, the escort-admin session operations include receiving a request (e.g., through an access management portal) for an external administrator to have access to a resource or resource instance (e.g., fabric controller) in a distributed computing environment (e.g., distributed computing environment 160). An access control manager (e.g., access control manager 120) accesses (and evaluates) a service team policy associated with the resource and the external administrator. The service team of the external administrator manages (i.e., creates, updates, controls, and deletes) the service team policy. The service team may include (in the service team policy) specific instructions on how an external administrator should be granted access. In this regard, the service team policy is used to approve access to the resource and the scope of access (i.e., access rights); however, the service team policy does not grant the external administrator access to the resource. The service team policy simply indicates the access rights of the external administrator for the resource. Advantageously, control of escorted-access management is (at least partially) delegated to the service team supporting the particular resource based on the service team policy.

Upon determining the access rights, the access control manager approves an escort-admin session for the external administrator and an identified escort operator. In addition, the access control manager accesses an escort-admin session engine 130 that identifies an escort operator (e.g., via the escort operator client 150) to assist with granting the external administrator access. For an identified escort operator, the access control manager approves an escort-admin session in an escort operator context.

The escort-admin session includes an escort operator context which refers to the escort operator having access rights (during the escort-admin session) based on the access rights approved using the service team policy. In other words, the escort-admin session includes an escort operator context which refers to the escort operator having dependent access rights associated the access rights approved based on the service team policy. The dependency relationship (or a limiting relationship) between the approved access rights and the dependent access rights can be defined in a variety of ways (e.g., the same rights, substantially the same, or mapped to a set of rights on the computing environment); however, generally, the approved access rights from the service team policy inform the dependent access rights that are actually used to access the computing environment. In one example, the escort-admin session comprises an escort operator context that limits the escort-admin session rights to the admin rights approved based on the service team policy for access to the resource.

The escort operator can then communicate with the external administrator so that the external administrator can shadow the escort operator (e.g., remote desktop shadow session).

In this regard, the escorted session (i.e., escort-admin session), even though approved through the service team policy, is in the escort operator context. While the external administrator is operating in the escort operator's context, the external administrator (by virtue of the escort operator's limited access) cannot have any additional access beyond that which has been approved. The escort-admin session can be configured exclusively for the external administrator and the escort operator. The access control manager may allow the escort operator to be audited as having direct access to the resource, the audit can also indicate the escort operator context with the admin rights based on the external administrator's approval. When the external administrator is done with escort-admin session, the external administrator can request access to be revoked. Revoking the external administrator's access triggers revocation of the escort operator's access.

It is contemplated that an external administrator's access rights may be expanded based on a second request; however, the external administrator does not need to log out of an active escort-admin session. In operation, the second request is approved for a second resource or the same resource and the active escort-admin session is then approved for increased admin right based on a second service team policy used to approve the external administrator's second request. Other variations and combinations of expanding or limiting the escort-admin session admin rights without ending an active escort-admin session are contemplated with embodiments described herein.

Aspects of the technical solution of this disclosure have been described with reference to several inventive features and advantages associated with escorted-access management using an escort-admin session engine. In particular, escort-access management operations of an access management system provides controlled and appropriately scoped escorted access to a resource instance. Overall, a practical application of aspects of the technical solution described results in improvements based on less CPU computation, smaller memory requirements, and increased flexibility in access management systems.

With reference to FIG. 2, FIG. 2 also discloses access management environment 100 with requestor client 110, access control manager 120, escort-admin session engine 130, and escort operator client 140. Initially at step 112, a request to access a resource is entered for an external administrator. At step 114, the request is communicated. At step 122, using a service team policy associated with the resource, the access control manager 120 approves the request and determines the access rights for the external administrator. At step 124, the access control manager 120 communicates a request for an escorted-admin session. At step 132, the escort-admin session engine generates a request for an escort operator. At step 134, the escort-admin session engine 130 communicates the request for an escort operator to escort operator client 140.

At step 142, the escort operator, at escort operator client 140, accepts the escort-admin session. At step 144, escort operator client 140 communicates information accepting the session. At step 146, the escort operator client 140 connects to session device. At step 136, the escort-admin session engine processes session information. At step 138, the escort-admin session engine communicates request approval to the access control manager 120. At step 126, the access control manager processes request approval. At step 128, the access control manager 120 communicates request approval to requestor client 110. At step 116, the requestor client 110 connects to a session device. At step 150A, the requestor client 110 ends the session. At step 150B, the escort operator client 140 ends the session. At step 150C, the access control manager 120 revokes access for the escort-admin session. At step 150D, the escort-admin session engine 130 marks the escort-admin session as ended.

Figure 3:
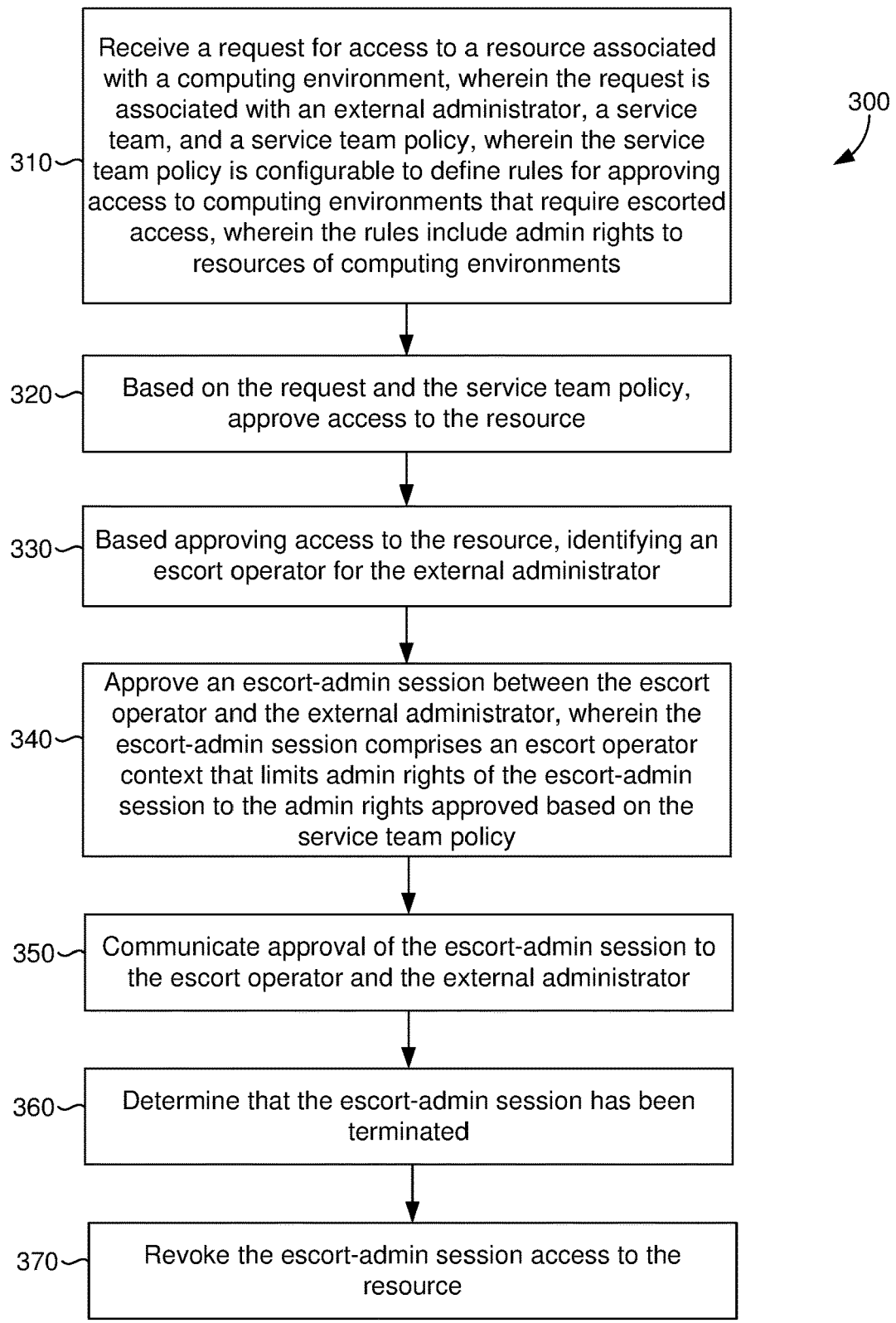
FIG. 3 provides a first exemplary method of providing escorted-access management operation using an escort-admin session engine in accordance with aspects of the technology described herein.
Figure 4:
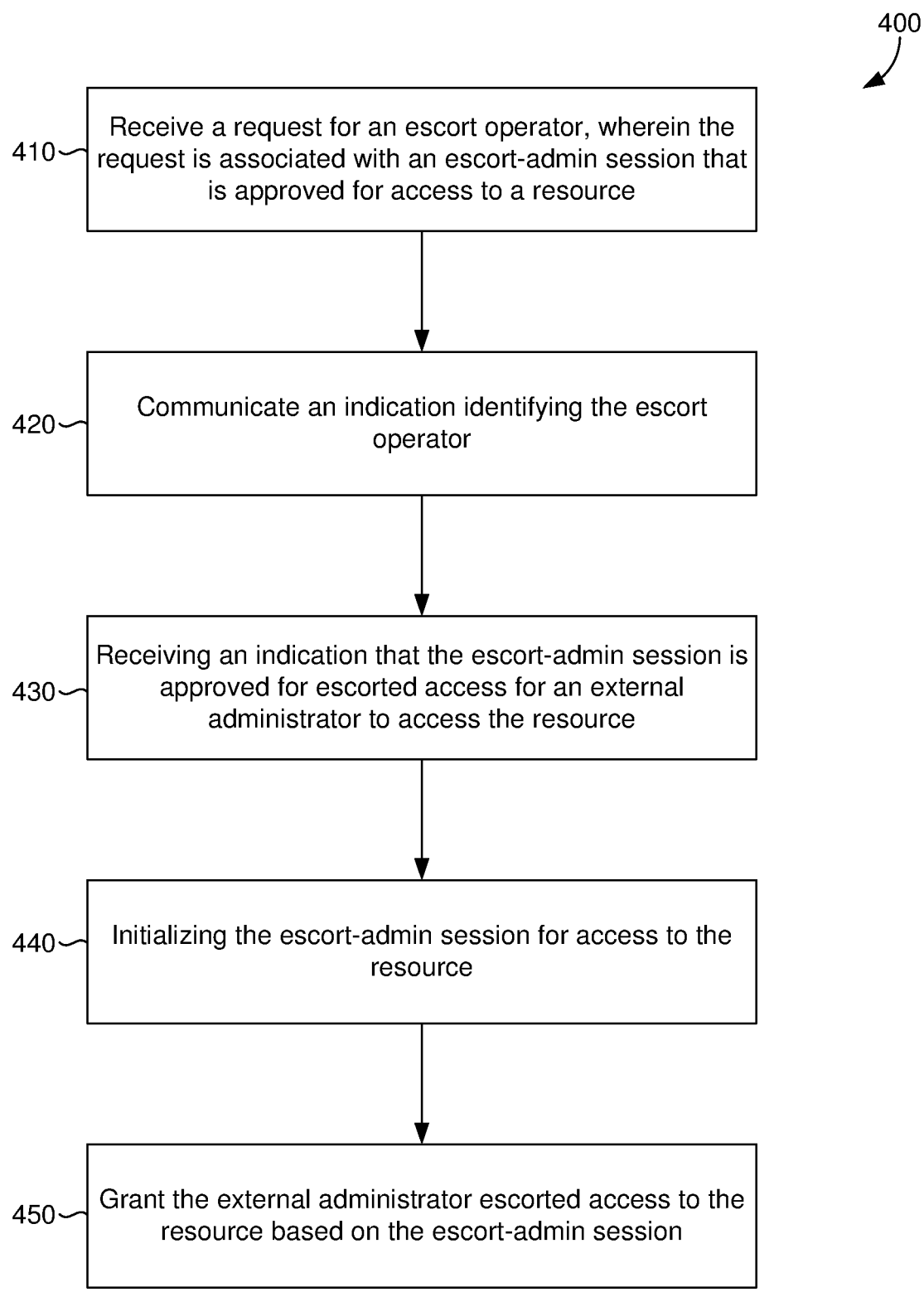
FIG. 4 provides a second exemplary method of providing escorted-access management operations using an escort-admin session engine, in accordance with aspects of the technology described herein.
Figure 5:
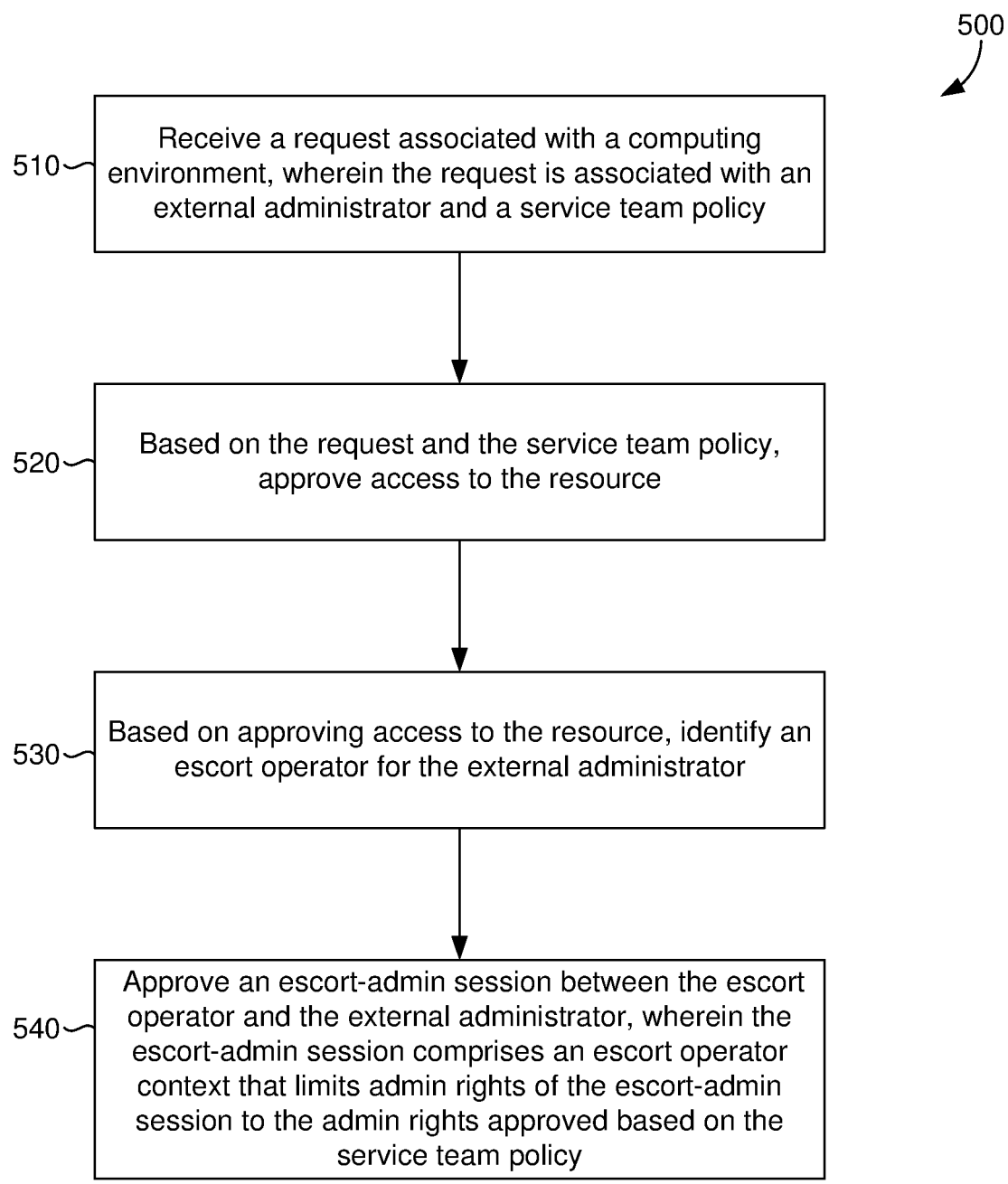
FIG. 5 provides a third exemplary method of providing escorted-access management operations using an escort-admin session engine, in accordance with aspects of the technology described herein.

Exemplary Methods for Providing Escorted-Access Management Using Escort-Admin Sessions With reference to FIGS. 3,4 and 5, flow diagrams are provided illustrating methods for providing escorted-access management using escort-admin sessions. The methods may be performed using the access management environment described herein. In embodiments, one or more computer storage media having computer-executable instructions embodied thereon that, when executed, by one or more processors can cause the one or more processors to perform methods in the access management environment.

Turning to FIG. 3, a flow diagram is provided that illustrates a method 300 for providing escorted-access management using escort-admin sessions. Initially at block, 310 a request for access to a resource associated with a computing environment is received. The request is associated with an external administrator, a service team, and a service team policy. The service team policy is configurable to define rules for approving access to computing environments that require escorted access. The rules include admin rights to resources of computing environments. At block 320, based on the request and the service team policy, access to the resource is approved. Approving access to the resource further comprises requesting approval from the service team associated with the service team policy, where the service team policy is a public policy that is managed by the service team. The service team maintains the service team policy for both a public computing environment and the computing environment, where the computing environment is a private computing environment. At block 330, based on approving access to the resource, an escort operator for the external administrator is identified. At block 340, an escort-admin session is approved between the escort operator and the external administrator. The escort-admin session comprises an escort operator context that limits admin rights of the escort-admin session to the admin rights approved based on the service team policy for access to the resource. The external administrator is granted direct access to the escort-admin session and granted indirect access to the resource based on the escort operator having access to the resource based on the escort-admin session and the external administrator having access to the escort-admin session. An escort engine is configured for identifying the escort operator for the external administrator, where identifying the escort operator is based on receiving a request from an access control manager to identify the escort operator, communicating the request to an escort operator client, and receiving identification of the escort operator.

At block 350, approval of the escort admin-session is communicated to the escort operator and the external administrator. The escort operator client initializes the escort-admin session, and approves a request from the external administrator to access the escort-admin session. At block 360, determine that the escort-admin session has ended (or expired). At 370, the escort-admin session access is revoked. The escort operator's access to the resource is revoked upon determining that the escort-admin session is terminated. An access control manager is configured for updating the admin rights for the escort operator admin access right context using a second set of admin rights, where the second set of admin rights are based on a second request associated with the external administrator.

Turning to FIG. 4, a flow diagram is provided that illustrates a method 400 for providing escorted-access management using escort-admin sessions. Initially at block 410, a request for an escort operator is received. The request is associated with an escort-admin session that is approved for access to a resource. At block 420, an indication is communicated identifying the escort operator. At block 430, an indication that the escort-admin session is approved for escort access for an external administrator to access the resource is received. At block 440, the escort-admin session is initialized for access to the resource. At block 450, the external administrator is granted access to the resource based on the escort-admin session.

Turning to FIG. 5, a flow diagram is provided that illustrates a method 500 providing escorted-access management using escort-admin sessions. Initially at block 510, a request associated with a computing environment is received. The request is associated with an external administrator and a service team policy. At block 520, based on the request and the service team policy, access to the resource is approved. At block 530, based on approving access to the resource, an escort operator for the external administrator is identified. At block 540, an escort-admin session between the escort operator and the external administrator is approved. The escort-admin session comprises an escort operator context that limits admin rights of the escort-admin session to the admin rights approved based on the service team policy.

Example Access Management System

Figure 6:
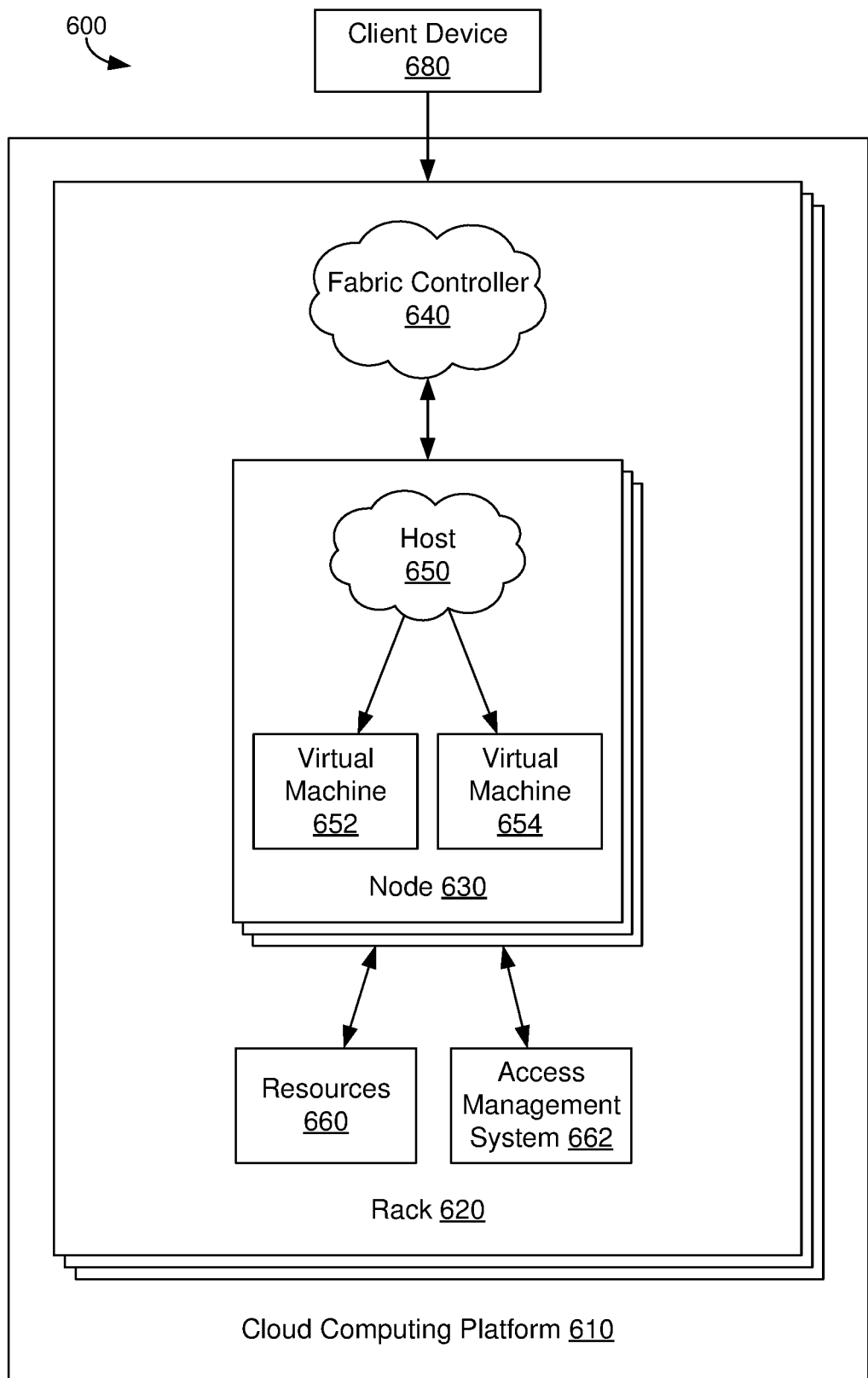
FIG. 6 provides a block diagram of an exemplary distributed computing environment suitable for use in implementing aspects of the technology described herein.

With initial reference the access management system 662 of FIG. 6, at a high level, access management (or access control) can refer to computing security processes and components that provide computer security based on identification, authorization, authentication, access approval, and auditing. An access management system can be implemented in a distributed computing environment to limit access to distributed computing environment resources. The access management system can be specifically implemented as a time-limited controlled access management system (e.g., Just-In-Time "JIT" service). By way of example, a Just-in-Time access management system can be a context-based access management system that provides temporary access to requesters to resources based on security policies. These policies can be designed as an ordered sequence of condition-action rules. When a request is submitted, it is evaluated against applicable rules in sequence and the results of the last matching action are taken to be the result of the policy evaluation. The result involves granting access to a resource with or without human approval or automatically denying the request. The JIT system applies the result, and when an access request is granted, the JIT system monitors the access and once it expires the access is revoked.

Time-limited controlled access can advantageously be used to lock down inbound traffic to virtual machines to reduce exposure to attacks, while providing easy access to virtual machines when needed. By way of example, when access management is enabled for a resource (e.g., VM), an access management system 662 can lock down inbound traffic to the resource by creating a network security group (NSG) rule. The resource, for example, may be a VM and selected ports are locked down and controlled using the access management system 662. As such, when a user requests access to a VM, the access management system 662 (e.g., a security center) checks that the user has a role-based access control permission that permits the user to successfully request to access the VM. If the request is approved, the security center can automatically configures a network security group (e.g., NSG) to allow inbound traffic to a selected port and requested source IP addresses or ranges, for the amount of time that was specified. After the time has ended (or expired), the security center restores the NSGs to previous states, while keeping the connections that are already established uninterrupted.

The access management system can support different types of policies for controlling access to resources. A VM can be configured to operate with a selected policy or group of policies. In an example implementation, when a VM is enabled for access management, the access management system 662 can create a "deny all inbound traffic" for selected ports; however, other manual port settings can also be configured. When requesting access to a VM, a user may identify the ports that the user wants to open and the source IP addresses that the port is opened on and the time window for which the port will be open. The access management system 662 may support requesting access to the ports that are configured in the policy. It is contemplated that each port may have a maximum allowed time derived from the policy.

The access management system 662 can further support auditing access activity by way of a log search. Permissions can be configured to limit access to configuring and use of the access management system 662. The access management system 662 can also optionally be configured programmatically. For example, representational state transfer (REST) APIs can be used to programmatically get information about configured VMs, add new ones, request access to a VM, and more.

Example Distributed Computing Environment

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller component 640 for provisioning and managing resource allocation, deployment, upgrade, and management of cloud services. Typically, cloud computing platform 610 acts to store data or run service applications in a distributed manner. Cloud computing platform 610 in a data center can be configured to host and support operation of endpoints of a particular service application. Cloud computing platform 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and computing device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610 and an access management system 662 (e.g., access control manager). It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but expose as a single device referred to as a cluster. Each server in the cluster can be implemented as a node.

Client device 680 may be linked to a service application in cloud computing platform 610. Client device 680 may be any type of computing device, which may correspond to computing device 700 described with reference to FIG. 7, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Operating Environment

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables that may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. An access management system for providing access to computing environments based on escorted-admin sessions, the system comprising:
   one or more processors; and
   one or more computer storage media storing computer-useable instructions that, when used by the one or more processors, cause the one or more processors to execute:
   receiving a request for access to a resource associated with a computing environment, wherein the request is associated with an external administrator, a service team, and a service team policy, wherein the service team policy is configurable to define rules for approving access to computing environments that require escorted access, wherein the rules indicate admin rights to resources of computing environments;
   based on the request and the service team policy, approving access to the resource;
   based on approving access to the resource, identifying an escort operator for the external administrator; and
   approving an escort-admin session between the escort operator and the external administrator, wherein the escort-admin session comprises an escort operator context that limits the escort-admin session rights to the admin rights approved based on the service team policy for access to the resource.

2. The system of claim 1, wherein approving access to the resource further comprises:
   requesting approval from the service team associated with the service team policy, wherein the service team policy is a public policy that is managed by the service team, wherein the service team maintains the service team policy for both a public computing environment and the computing environment, wherein the computing environment is a private computing environment.

3. The system of claim 1, wherein the external administrator is granted direct access to the escort-admin session and granted indirect access to the resource based on the escort operator having access to the resource based on the escort-admin session and the external administrator having access to the escort-admin session.

4. The system of claim 1, further comprising an escort engine configured for identifying the escort operator for the external administrator, wherein identifying the escort operator is based on:
   receiving a request from an access control manager to identify the escort operator;
   communicating the request to an escort operator client; and
   receiving identification of the escort operator.

5. The system of claim 1, further comprising an escort operator client initializing the escort-admin session; and approving a request from the external administrator to access to the escort-admin session.

6. The system of claim 1, further comprising revoking the escort operator access to the resource upon determining that the escort-admin session is terminated.

7. The system of claim 1, further comprising an access control manager configured for: updating the admin rights for the escort operator admin access right context using a second set of admin rights, wherein the second set of admin rights are based on a second request associated with the external administrator.

8. One or more non-transitory computer storage media having computer-executable instructions embodied thereon that, when executed, by one or more processors, cause the one or more processors to perform a method for providing access to computing environments based on escorted-admin sessions, the method comprising:
receiving a request for access to a resource associated with a computing environment, wherein the request is associated with an external administrator, a service team, and a service team policy, wherein the service team policy is configurable to define rules for approving access to computing environments that require escorted access, wherein the rules indicate admin rights to resources of computing environments;
based on the request and the service team policy, approving access to the resource;
based on approving access to the resource, identifying an escort operator for the external administrator; and
approving an escort-admin session between the escort operator and the external administrator, wherein the escort-admin session comprises an escort operator context that limits the escort-admin session rights to the admin rights approved based on the service team policy for access to the resource.

9. The media of claim 8, wherein approving access to the resource further comprises:
requesting approval from the service team associated with the service team policy, wherein the service team policy is a public policy that is managed by the service team, wherein the service team maintains the service team policy for both a public computing environment and the computing environment, wherein the computing environment is a private computing environment.

10. The media of claim 8, wherein the external administrator is granted direct access to the escort-admin session and granted indirect access to the resource based on the escort operator having access to the resource based on the escort-admin session and the external administrator having access to the escort-admin session.

11. The media of claim 8, wherein an access vector includes a tag indicating a type of access to customer data associated with the access vector.

12. The media of claim 8, further comprising an escort operator client initializing the escort-admin session; and approving a request from the external administrator to access the escort-admin session.

13. The media of claim 8, further comprising revoking the escort operator access to the resource upon determining that the escort-admin session is terminated.

14. The media of claim 8, further comprising an access control manager configured for: updating the admin rights for the escort operator admin access right context using a second set of admin rights, wherein the second set of admin rights are based on a second request associated with the external administrator.

15. A computer-implemented method for providing access to computing environments based on escorted-admin sessions, the method comprising:
receiving a request for access to a resource associated with a computing environment, wherein the request is associated with an external administrator, a service team, and a service team policy, wherein the service team policy is configurable to define rules for approving access to computing environments that require escorted access, wherein the rules indicate admin rights to resources of computing environments;
based on the request and the service team policy, approving access to the resource;
based on approving access to the resource, identifying an escort operator for the external administrator; and
approving an escort-admin session between the escort operator and the external administrator, wherein the escort-admin session comprises an escort operator context that limits the escort-admin session rights to the admin rights approved based on the service team policy for access to the resource.

16. The method of claim 15, wherein approving access to the resource further comprises:
requesting approval from the service team associated with the service team policy, wherein the service team policy is a public policy that is managed by the service team, wherein the service team maintains the service team policy for both a public computing environment and the computing environment, wherein the computing environment is a private computing environment.

17. The method of claim 15, wherein the external administrator is granted direct access to the escort-admin session and granted indirect access to the resource based on the escort operator having access to the resource based on the escort-admin session and the external administrator having access to the escort-admin session.

18. The method of claim 15, further comprising an escort operator client initializing the escort-admin session; and approving a request from the external administrator to access the escort-admin session.

19. The method of claim 15, further comprising revoking the escort operator access to the resource upon determining that the escort-admin session is terminated.

20. The method of claim 15, further comprising updating the admin rights for the escort operator admin access right context using a second set of admin rights, wherein the second set of admin rights are based on a second request associated with external administrator.

* * * * *